Dec. 22, 1970 L. M. GUGLIOTTI 3,550,016
MULTIPLEXING SWITCH
Filed Nov. 13, 1968
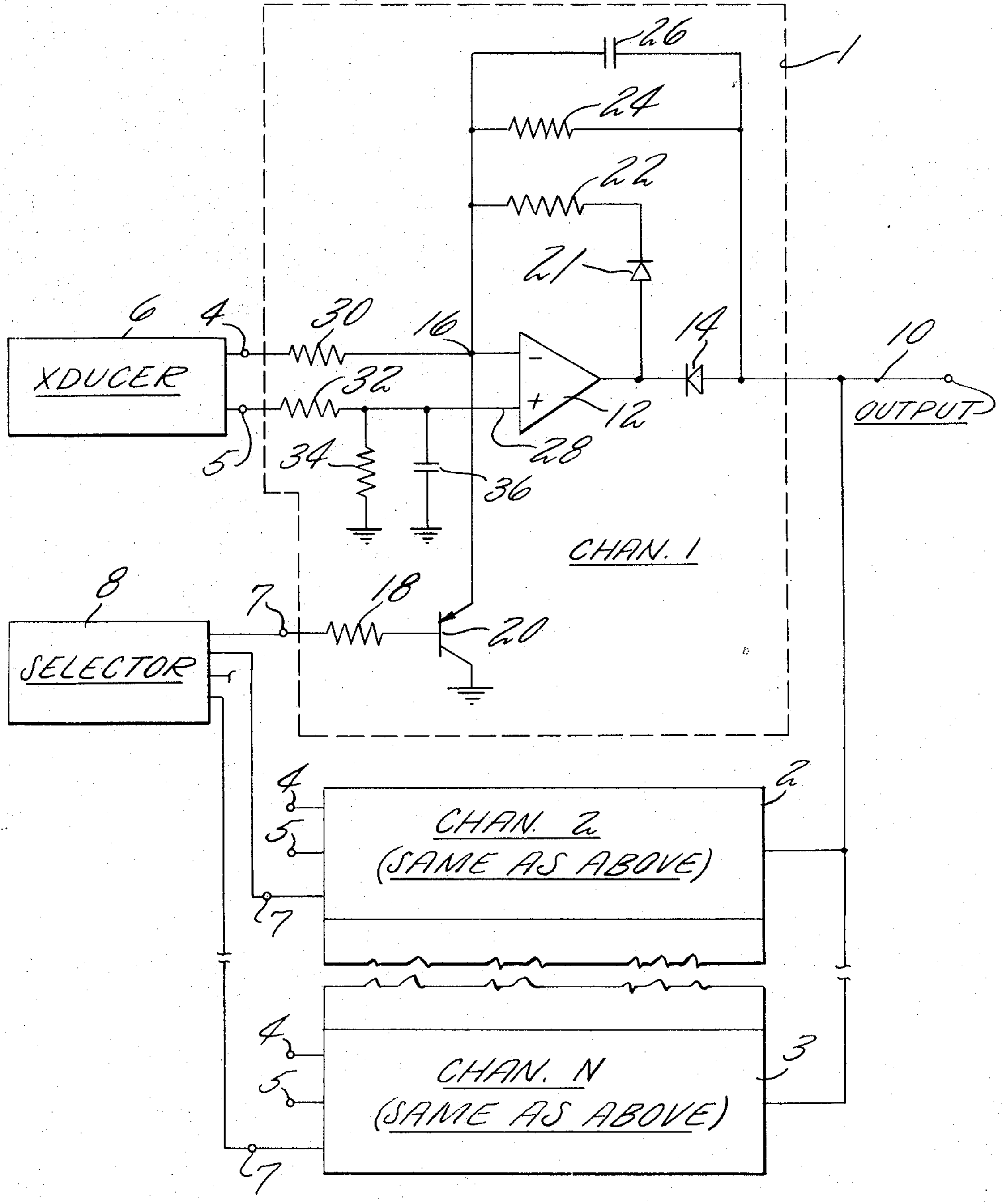
INVENTOR
LOUIS M. GUGLIOTTI
BY Melvin Pearson Williams
ATTORNEY United States Patent Office 3,550,016

Patented Dec. 22, 1970

3,550,016
MULTIPLEXING SWITCH

Louis M. Gugliotti, Tolland, Conn., assignor to United Aircraft Corporation, Hartford, Conn., a corporation of Delaware Filed Nov. 13, 1968, Ser. No. 775,248
Int. Cl. H03k *17/02*
U.S. Cl. 328—104 1 Claim

ABSTRACT OF THE DISCLOSURE

A plurality of data channels, each having a differential amplifier therein, are selectively multiplexed to a single output data channel by allowing the polarity of the amplifier output to be in phase with a unilateral impedance which is in the forward path of a feedback circuit of the amplifier. In order to disconnect a channel, conduction of a non-critical switch causes the amplifier input of one sign to be grounded, thus driving the output to the polarity which is blocked by the unilateral impedance in the forward path of the feedback circuit.

BACKGROUND OF THE INVENTION

Field of invention

This invention relates to multiplexing, and more particularly to simplified switch means for selectively interconnecting a plurality of data channels on to a single output data channel.

Description of the prior art

A wide variety of multiplexing switch systems are known in the art. Some of these use incremental chopper input devices and similar switching components which require drive isolation. Isolated drive type circuitry usually requires one or more transformers for isolation which in turn requires pulsed sampling and prohibits the use of long or variable DC sampling signal levels. In addition, if electronic switches (such as transistors and field effect devices) are used, they must have extremely low offset voltages, low saturation resistance, and good temperature stability in order not to provide errors in the data signals being multiplexed.

Techniques involving the shorting out of unconnected channels (sometimes referred to as shunt switching) requires the use of precision resistors, and provides additive errors as a result of offset voltages of the switches used. In addition, the gain of the overall system is significantly reduced by the number of resistors related to the switching of all of the channels. Any offset errors generated are amplified as a result of the inherent circuit design.

Additionally, many complex expensive and cumbersome multiplex switching systems are known in the art.

SUMMARY OF THE INVENTION

The object of the present invention is to provide an improved, economical, simple and reliable multiplex switching apparatus.

In accordance with the present invention, a differential amplifier has a unilateral impedance in the forward path of a feedback network, and the amplifier is selectively driven to an output polarity opposite to that of the unilateral impedance in order to remove it from connection to an output data channel to which the channel is to be selectively connected.

The present invention provides a relatively inexpensive yet precise method of performing a multiplexing function, without the need for precision components and without sacrificing other operating parameters of the circuitry involved.

The foregoing and other objects, features and advantages of the present invention will become more apparent in the light of the following detailed description of a preferred embodiment thereof, as illustrated in the accompanying drawing.

BRIEF DESCRIPTION OF THE DRAWING

The sole figure herein comprises a schematic block diagram of a multiplexing switch in accordance with the present invention.

DESCRIPTION OF THE PREFERRED EMBODIMENT

Referring now to the figure, a plurality of channels 1–3 each have a pair of input terminals 4, 5 adapted for connection to a source, such as transducer 6. Each of the channels 1–3 also has a control input terminal 7 which is adapted for connection to the logic circuitry of a selector mechanism 8 that governs the selection of individual channels for connection to a data output channel 10. Each of the channels 1–3 employs the same circuitry and the description thereof will be given with respect to channel 1, which is shown in detail. The channel 1 has a differential amplifier 12 the output of which includes a unilateral impedance such as a diode 14 in the forward path of a feedback network that includes other circuit elements.

Briefly described, when channel 1 is to be connected to the data output channel 10, the amplifier 12 operates in the normal fashion, and the diode 14 passes signals of a negative polarity to the data output channel 10, signals of a positive polarity being blocked thereby. On the other hand, when the channel 1 is not to be connected, then the out-of-phase input 16 is grounded so that the output signals of the amplifier 12 are all between ground and a positive potential and there is no output applied to the data output channel 10. In addition, channel 1 represents a relatively high impedance to the negative signals being applied to the data output channel 10 by one of the other channels 2, 3 which is selected for operation during this period of time.

To effect the grounding of the input terminal 16, a ground signal at the control input terminal 7 is coupled through a resistor 18 to the base of a PNP transistor 20 which causes the transistor to saturate, thus driving the point 16 toward ground. This unbalances the amplifier, driving the output positive, and putting the amplifier in its blocking state. As a result of a diode 21 and a resistor 22 in the feedback path about the amplifier 12, the amplifier is clamped with very low forward gain for negative signals at the input 16. Grounding can also be effected through a diode in place of PNP transistor 20.

The high open loop gain of the amplifier (on the order of 100,000) tends to almost completely eliminate any offsets created by the diode 14 since errors introduced by the diode 14 are fed back to the summing input 16 in the case where the input 16 is not driven to ground and negative output signals are coupled to the diode 14. The resistor 24 will typically have an impedance on the order of a megohm.

Each of the input terminals 4, 5 is coupled to a related amplifier terminal 16, 28 by related resistors 30, 32. These resistors preferably have approximately the same impedance. The terminal 28 is connected to ground through a resistor 34 and a capacitor 36. The capacitors 26 and 36 are used to restrict the bandwidth of the amplifier so as to reduce noise.

Resistor 34 balances the amplifier to minimize DC drift and provides proper gain scaling for the differential connection.

When the amplifier is in its blocking state, it can be maintained in a linear range by proper choice of the size of feedback resistor 22. This results in speeding up settling times. Any one of the channels 1–3 which is in operation will see an equivalent shunt impedance on the output line 10 which includes feedback resistors of all the other amplifiers. Thus, each amplifier must be capable of driving this load which may be on the order of thousands of ohms.

The transistor 20 is not in series or shunt with the signal; it appears in the circuit substantially only when throwing the amplifier 12 into the blocking state, and it poses a fairly high impedance at all other times. Therefore, its offset characteristics are not important in the operation of the circuit. Specifically, the characteristics of the transistor when conducting introduces no errors into the selection signal path since the transistor conducts when the amplifier is in the blocking condition and therefore is not providing a signal to the data output line 10. The only error introduced into the signal path is due to leakage currents which will be small because there is no appreciable reverse voltage across the transistor and the input resistors of the amplifier are of relatively low impedance.

Although the invention has been shown and described with respect to a preferred embodiment thereof, it should be understood by those skilled in the art that various changes and omissions in the form and detail thereof may be made therein, without departing from the spirit and the scope of the invention.

Having thus described a typical embodiment of my invention, that which I claim is new and desired to secure by Letters Patent of the United States is:

1. A multiplexer comprising a plurality of stages each including:
- a differential amplifier;
- an output channel signal line adapted for connection to a common output channel;
- a feedback loop comprising a forward path and feedback path, said output channel signal line being connected to the junction of the forward path and the feedback path, said feedback path connected to one input terminal of said differential amplifier;
- a first unilateral impedance in said forward path joining said junction with the output of said differential amplifier;
- switch means connected to an input terminal of said amplifier for selectively driving said one input terminal of said amplifier toward ground, whereby the output signal of said amplifier will be of a polarity blocked by said first unilateral impedance means; and
- a second feedback path from the junction of said first unilateral impedance with said amplifier output to said one input terminal, including a second oppositely poled unilateral impedance poled to clamp said amplifier with very low gain for output signals of said amplifier blocked by said first unilateral impedance.

References Cited

UNITED STATES PATENTS

| | | | |
|---|---|---|---|
| 2,300,999 | 11/1942 | Williams | 328—104 |
| 2,840,707 | 6/1958 | Johnson | 328—151 |
| 3,259,760 | 7/1966 | Marey | 328—151 |
| 3,243,585 | 3/1966 | Escobosa | 328—104 |
| 3,152,319 | 10/1964 | Gordon et al. | 328—104 |
| 2,974,285 | 3/1961 | Schenck | 328—104 |
| 3,204,118 | 8/1965 | Rotier | 307—229 |

DONALD D. FORRER, Primary Examiner

H. A. DIXON, Assistant Examiner

U.S. Cl. X.R.

307—229, 243; 328—95, 97